Patented Mar. 23, 1926.

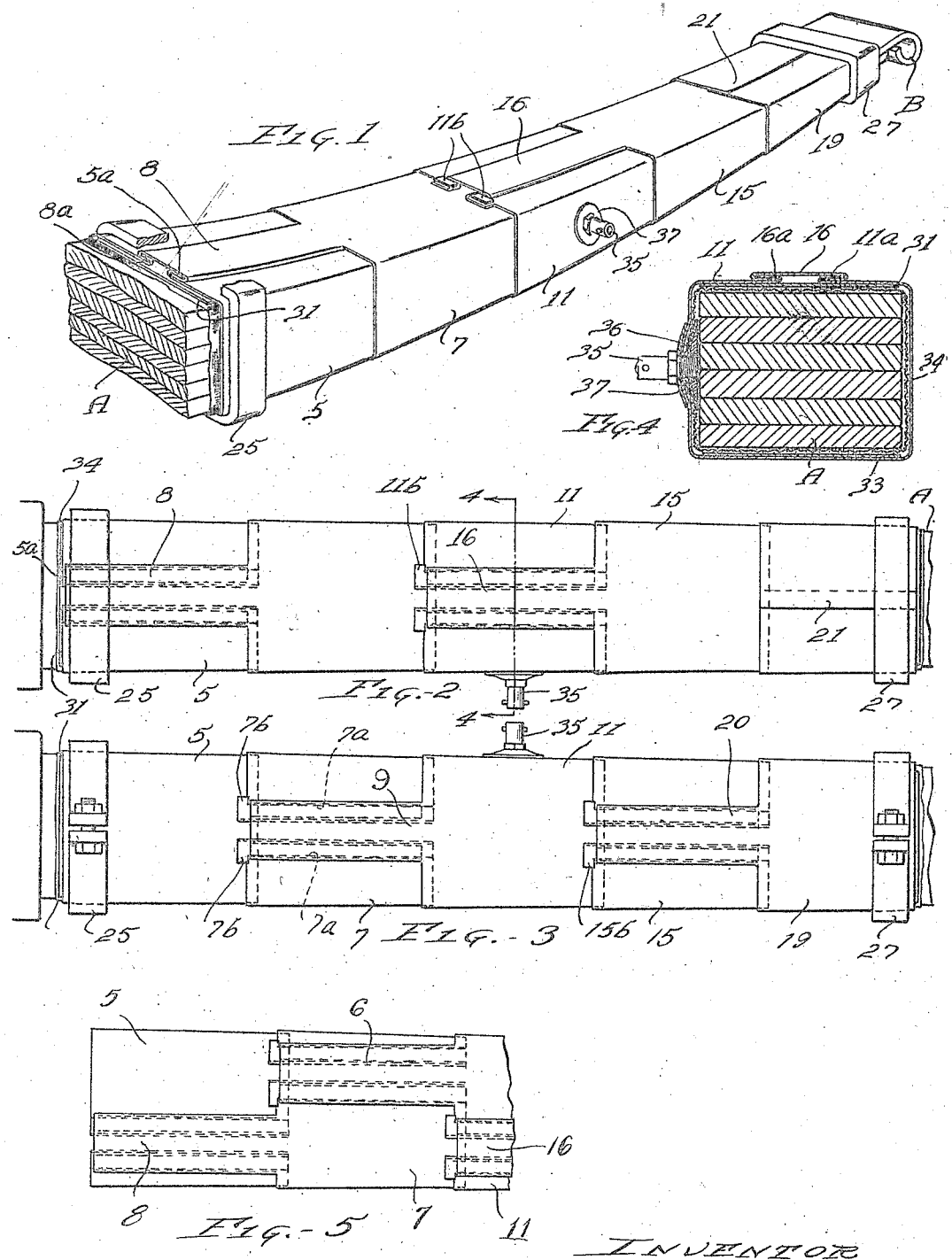

1,577,623

UNITED STATES PATENT OFFICE.

ALBERT R. GOLDRICK, OF CLEVELAND, OHIO, ASSIGNOR, BY MESNE ASSIGNMENTS, TO ALBERT E. HODGINS, OF CLEVELAND, OHIO.

VEHICLE SPRING COVER.

Application filed October 30, 1922. Serial No. 597,749.

*To all whom it may concern:*

Be it known that I, ALBERT R. GOLDRICK, a citizen of the United States, residing at Cleveland, in the county of Cuyahoga and State of Ohio, have invented a certain new and useful Improvement in Vehicle Spring Covers, of which the following is a full, clear, and exact description, reference being had to the accompanying drawings.

This invention is directed to the provision of a novel construction of vehicle spring covers such as is adaptable for the reception of lubricant under pressure.

The object of the present invention is the provision of a novel, simple, efficient construction of an outer metallic casing of such a cover.

More specifically, my invention is directed to a novel arrangement of a plurality of articulated sections extending around four sides of the spring and joined longitudinally thereof, the joining means of one section being formed integral with an adjacent section.

Other objects will become apparent from the following description in connection with the accompanying drawings. The essential features will be summarized in the claims.

In the drawings, Fig. 1 is a perspective view of a vehicle spring protected by a casing embodying my invention; Fig. 2 is a top plan view of the casing; Fig. 3 is a bottom plan view of the casing; Fig. 4 is a cross sectional view taken transversely of the spring and casing substantially through a lubricant receiving means; Fig. 5 is a modified form of the casing construction showing an improved method of joining the sections comprising the casing.

In Fig. 1, I show a metallic casing comprising a plurality of sections joined longitudinally of the spring leaves A, the joints of the sections being disposed alternately along the top and bottom surface of the casing. An inner end section 5 is shown on Fig. 1 extending around four sides of the spring laminations with the edges thereof suitably flanged, as indicated at 5ª, to be engaged by flanges 8ª formed along longitudinal edges of a strip 8 integral with and projecting from the top portion of an adjacent section 7.

As shown in Fig. 3, the section 7 has the longitudinal edges thereof disposed along the bottom of the spring and joined by a similar projecting strip 9 formed integral with the next section 11. The flanged portions 7ª thereof, however, extend a slight distance beyond the end of the clamping portion 9 of the section 11 to provide a lug portion 7ᵇ which projects beyond the engaging flanges of the member 7 and clamping strip 9 a sufficient distance to limit relative movement between the sections 7 and 11.

The section 11 is joined along the top of the casing by a longitudinally extending strip 10 formed integral with the adjacent strip 16, there being lug portions 11ᵇ formed on the member 11 similar to the lug portions 7ᵇ to limit the relative movement of the sections 11 and 15. The section 15 in turn is joined along the bottom thereof by an integral projecting strip 20, the section 15, however, having a top lap joint. The section 19 may be held in position by an end clamping member 27. The inner end of the cover may be held in position by a similar clamping member 25.

The construction of the sections is such as to permit of the casing being positioned upon a spring which is on a vehicle without the removal of any of the vehicle parts. The spring blades A may be first covered with an inner lubricant impervious lining 34 after which each section may be positioned thereon, and engage metallic filler strips 31 and 33 extending along the top and bottom of the spring leaves, the section 5 being first placed over the strips, and the section 7 being next positioned thereon with the flanged joining portions 8 engaging the flanges 5ª in the manner described.

To afford communication with the interior of the casing, I provide a grease gun coupling member 35 engaging a washer 36 disposed within the lining and a second washer member 37 positioned exteriorly of the casing section 11 and in contact with the side wall thereof. The section 11 may be suitably perforated with an outwardly pressed portion surrounding the perforation to afford a clamping arrangement between the casing and the lining, by the coupling member 35 and the respective washers as illustrated in Fig. 4.

In the modified form which I have illustrated in Fig. 5 the joining strips of the respective members may be disposed along the top or the bottom of the spring leaves with the joints disposed in staggered relation, as illustrated in this figure. This construction would be preferable where access to the top of the spring is difficult. An additional advantage of such a construction is that only a very small relative movement of the engaging flanges would be present if all of the joints were disposed along the bottom of the spring.

From the foregoing description, it will be noted that I have provided a very simple and economical vehicle spring cover comprising an inner fabric lining which is preferably impervious to lubricant, and an outer casing formed of a plurality of relatively movable sections, whereby the casing may respond to the deflecting movement of the spring laminations without any deteriorating effects and which comprise elements provided with means for clamping adjacent elements upon the spring laminations.

Having thus described my invention, I claim:

1. In a vehicle spring cover, the combination of an inner lubricant impervious lining surrounding the spring laminations, and an outer metallic casing comprising a plurality of inter-engaging sections, each section provided with means for engaging longitudinal flanges formed on the adjacent section.

2. In a spring casing of the character described, the combination of a plurality of sections surrounding four sides of the spring, clamping means on each section engaging longitudinal edges of adjacent sections, and means carried thereby limiting the relative movement of the respective sections.

3. In a vehicle spring cover, the combination of a plurality of relatively movable sections, each section provided with means for engaging longitudinal flanges formed on the adjacent section.

4. In a spring casing of the character described, the combination of a plurality of relatively movable sections surrounding four sides of the spring, clamping means on each section engaging longitudinally extending flanges formed on adjacent sections, and means carried thereby limiting the relative movement of the respective sections.

5. In a spring casing of the character described, the combination of an inner lubricant impervious lining and an outer metallic casing, said outer casing comprising a plurality of relatively movable sections, each section surrounding four sides of the spring and being provided with means for clamping adjacent sections upon the spring, and clamping means engaging the end sections to maintain the spring casing in position on the spring laminations.

6. In a spring casing of the character described, the combination of an inner lubricant impervious lining and an outer metallic casing, said outer casing comprising a plurality of relatively movable sections, each section surrounding four sides of the spring and provided with means for clamping longitudinally extending flanges formed on adjacent sections.

7. In a spring casing of the character described, the combination of an inner lubricant impervious lining, and an outer metallic casing formed of a plurality of relatively movable sections, said sections having edges thereof joined longitudinally of the spring, each section having means formed integral therewith for joining the adjacent sections, and means formed on adjacent sections for limiting the relative movement thereof.

8. A spring casing of the character described, comprising a plurality of relatively movable sections completely surrounding the spring laminations, the sections having flanged edges joined longitudinally of the spring, and each section having means formed integral therewith for effecting a longitudinal joining of adjacent sections, and an end section having means for joining an adjacent section longitudinally of the spring and provided with a longitudinally extending lap joint, whereby said end sections completely surround four sides of the spring.

9. A vehicle spring cover of the character described, comprising a plurality of relatively movable sections joined longitudinally of the spring, the sections having joining strips extending the entire length of adjacent sections and engaging flanges on said adjacent sections.

10. A vehicle spring cover comprising a plurality of relatively movable metallic sections extending over four sides of the spring, each section having flanges formed along the longitudinal edges thereof and having an extension portion engaging longitudinal flanges of a adjacent section, the flanges of the respective casings being so formed as to limit relative movement between adjacent sections.

11. A spring casing comprising a plurality of relatively movable sections joined longitudinally of the spring, each section having an integral extending portion joining the flanges of an adjacent section, the connections between the respective sections being alternately disposed on the top and bottom of the spring.

12. In a spring casing of the character described, the combination of an inner lubricant impervious lining, an outer metallic casing formed of a plurality of relatively movable sections, said sections having the edges thereof joined longitudinally of the spring, each section having means formed integral therewith for joining the adjacent sections, and alternately disposed along the top and bottom of the spring, and means formed on adjacent sections for limiting the relative movement thereof.

13. A spring casing of the character described, comprising a plurality of relatively movable sections extending over four sides of the spring laminations, each section having flanged edges joined longitudinally of the spring, and each section having means formed integral therewith for effecting the longitudinal joining of adjacent sections, said means being disposed alternately along the top and bottom of the spring, and an end section having means for joining an adjacent section longitudinally of the spring and provided with a lap joint, whereby said end sections completely surround four sides of the spring.

14. In a vehicle spring cover, the combination of a plurality of relatively movable sections, each section being formed to engage an adjacent section along a longitudinal joint.

15. In a vehicle spring cover, the combination of a plurality of relatively movable sections, each section being formed to engage an adjacent section along a longitudinal joint, and means limiting relative movement of the respective sections.

16. In a spring cover the combination of a flexible metallic casing comprising a plurality of relatively movable sections, several of the sections being provided with means for closing an adjacent section.

17. In a spring cover the combination of a plurality of tubularly formed sections, several of the sections being provided with an integral means adapted to seal and maintain an adjacent section in co-operative relation therewith.

In testimony whereof, I hereunto affix my signature.

ALBERT R. GOLDRICK.